United States Patent [19]

Cundy

[11] Patent Number: 4,974,467

[45] Date of Patent: Dec. 4, 1990

[54] STEPPED RING GEAR

[75] Inventor: Graeme M. Cundy, Milford, New Zealand

[73] Assignee: Maxwell Marine Limited, Takapuna, New Zealand

[21] Appl. No.: 415,985

[22] Filed: Oct. 2, 1989

Related U.S. Application Data

[62] Division of Ser. No. 190,706, May 5, 1988.

[30] Foreign Application Priority Data

May 8, 1987 [NZ] New Zealand ........................ 220238

[51] Int. Cl.[5] .......................... F16H 55/08; F16H 5/72

[52] U.S. Cl. ...................................... 74/462; 74/810.2

[58] Field of Search ................. 74/460, 462, 810, 812, 74/810.1, 810.2; 254/295, 297, 298, 342, 344, 345, 346, 354, 355; 192/114 T

[56] References Cited

U.S. PATENT DOCUMENTS

| | | | |
|---|---|---|---|
| Re. 30,881 | 3/1982 | Huggett et al. | 254/345 |
| 77,346 | 4/1868 | Bailey | 74/462 X |
| 742,812 | 10/1903 | Winton | 74/462 X |
| 1,098,762 | 6/1914 | Richards | 254/345 X |
| 1,297,835 | 3/1919 | Guay | 74/462 X |
| 2,070,140 | 2/1937 | Peterson et al. | 192/114 T |
| 3,305,061 | 2/1967 | Duncan | 192/114 T |
| 3,918,560 | 11/1975 | Zach | 74/462 X |
| 3,927,580 | 12/1975 | Fawcett | 254/344 X |
| 4,054,266 | 10/1977 | Guangorena | 254/345 |
| 4,055,092 | 10/1977 | Aberg | 74/439 |
| 4,725,043 | 2/1988 | Atfield et al. | 254/354 |

FOREIGN PATENT DOCUMENTS

| | | | |
|---|---|---|---|
| 207903 | 3/1940 | Switzerland | 74/440 |
| 341374 | 1/1931 | United Kingdom . | |
| 406313 | 2/1934 | United Kingdom . | |
| 458319 | 12/1936 | United Kingdom . | |
| 481315 | 3/1938 | United Kingdom . | |
| 495359 | 11/1938 | United Kingdom . | |
| 582860 | 11/1946 | United Kingdom . | |

*Primary Examiner*—Allan D. Herrmann
*Attorney, Agent, or Firm*—Bernard R. Gans

[57] ABSTRACT

A multispeed winch or gear box wherein an axially-movable gear located on a shaft parallel to the drive shaft is movable by operation of a lift mechanism to be in a first position in engagement with a specific gear train or in a second position out of engagement with the said gear train. Further, the winch or gear box can have a gear on the drive shaft with a lip or shoulder which can retain the axially-movable gear in the upper or first position after the lift mechanism has moved the axially movable gear to the first position, and the lift mechanism has been withdrawn. This arrangement will permit the gear box or winch to automatically shift from first speed to second speed to third speed upon reversal of the drive shaft rotation.

4 Claims, 4 Drawing Sheets

Fig. 5.
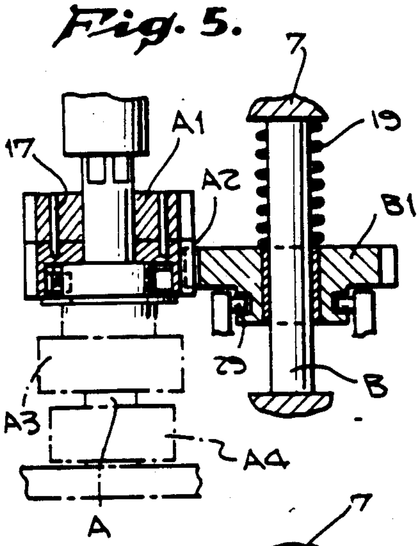
Fig. 8.
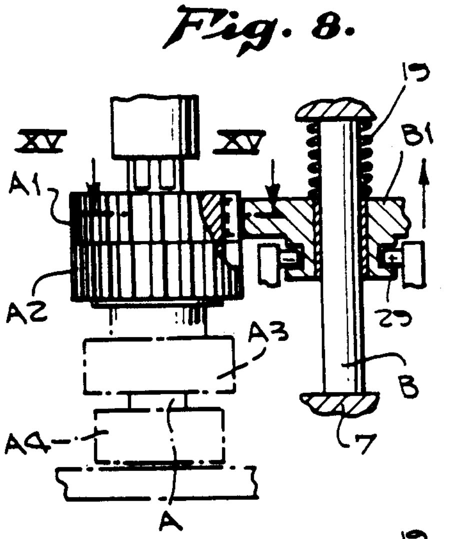
Fig. 6.
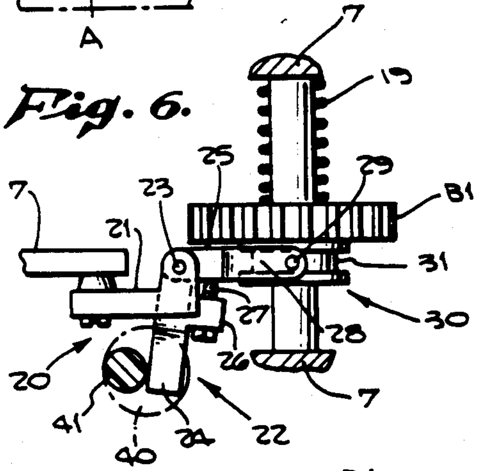
Fig. 9.
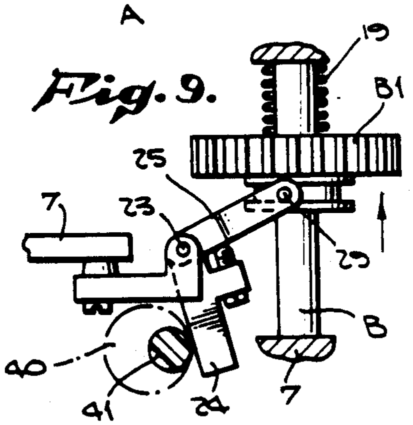
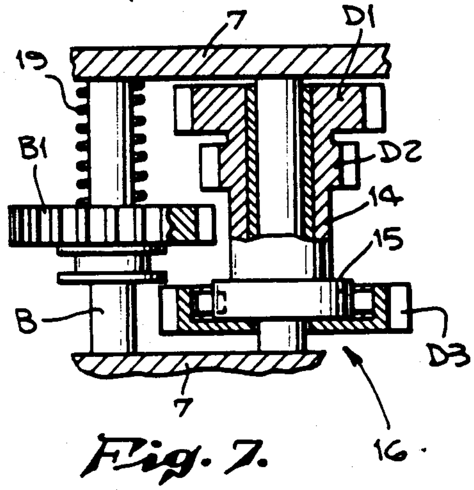
Fig. 7.
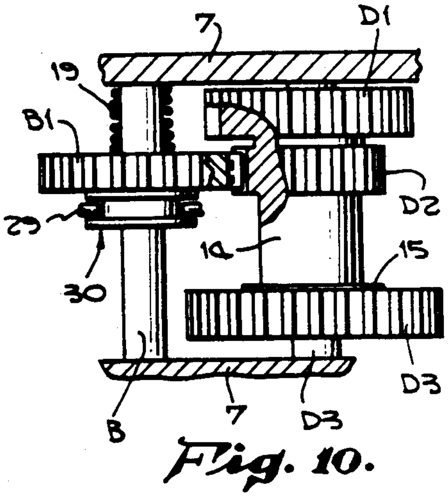
Fig. 10.

STEPPED RING GEAR

This is a divisional of copending application Ser. No. 07/190,706 filed on May 5, 1988.

BACKGROUND OF THE INVENTION

This invention relates to gear boxes and transmissions, particularly those used in winches having multiple speeds or gear ratios in one direction of drum rotation.

Two speed winches have long been in existence, wherein a reversal of the rotation of the drive shaft provides a different rotational speed for the drum given a fixed rotational speed for the shaft. Although, the word "speed" is frequently used to describe the operation of a winch drum under the effect of different gear trains, what is actually meant is that the winch can operate with different mechanical advantages. The term "first speed" general means the highest drum speed, which corresponds to the lowest mechanical advantage provided by the winch. This first speed allows the drum to be turned at the fastest rotational speed under conditions of low line load thereby allowing the operator to quickly bring in a line, coil, or rope. The next speed, generally called the "second speed" has a slower drum rotational speed than the first speed and provides a higher mechanical advantage, useful when the line load has increased.

Obviously, because the drive shaft can be rotated in two directions (i.e. clockwise or counterclockwise), it has been simple to design two speed winches wherein the drum rotation in one direction can be operated with two different gear ratios. However, a need has been recognized to provide winches having more than two speeds where there can be a large variation of line loads.

Because winches are frequently used on sailing ships where the loads can vary greatly, and can change quickly, there is a need for multispeed winches that can quickly, smoothly, and automatically change between three or more speeds upon reversal of the drive shaft rotation.

It has also been desirable for winches that are used on sailing craft to be adaptable to having the direction of its drum rotation changed to accommodate different locations on the craft, that is, allowing the line to be pulled from the most convenient position (i.e., having the drum rotate clockwise or counterclockwise).

SUMMARY OF THE INVENTION

This invention is directed to a gear box or transmission which takes the power inputed into a rotatable drive shaft and converts it to output power. The drive shaft can be rotated in two directions, i.e., clockwise and counterclockwise, and can be operated by a prime mover (e.g., motor) or manually. Although the invention relates to the construction of a gear box which is capable of producing three or more output speeds, the invention will be discussed in relationship with a winch.

In simplistic terms, a winch is operated by rotating a primary drive shaft either manually, for example with a crank handle, or with a prime mover, such as a motor. The drive shaft is provided with one or more axially-mounted gears which transfer the rotational power of the drive shaft to one or more gear trains, there being a different gear train for each speed. The drum, which is rotatably mounted on the base of the winch, is provided with an internal ring gear. The gear trains receive rotational power from the drive shaft and transfer it to the drum's internal ring gear to create drum rotation. The gear trains include one or more secondary shafts upon which gears are axially mounted.

In general, a gear which is axially mounted on a shaft can be affixed to the shaft such that it must rotate with the shaft in both directions of rotation. Or, a gear mounted on a shaft can be unidirectional, meaning that it rotates with the shaft in one direction but is separated from the shaft in the other direction and does not rotate together (e.g., such as by a pawl and ratchet mechanism). Some gears, in fact, may be axially mounted on a shaft and can rotate independent of the shaft in either direction (e.g., idler gear).

Also, two gears on a shaft may be mounted in such a way that both gears are integrally connected and thus turn together in both directions, or are connected through a unidirectional mechanism (e.g., ratchet and pawl mechanism) so that the gears turn together in one direction if the appropriate gear is the driving gear.

Finally, the relationship between a shaft and its axially-mounted gear is such that either the rotating shaft drives the gear or the rotating gear drives the shaft. It is through the innumerable combination and variety of gears and shafts in a gear box that winches are designed to transfer the energy imparted to the drive shaft to the rotating drum.

The present invention provides a gear box which is useful in a winch having three or more speeds or gear trains to drive the winch drum. The preferred winch of this invention is intended to operate at three different speeds upon two successive reversals of rotation of the drive shaft. This is accomplished by providing a secondary axial shaft upon which is mounted an axially movable traveler gear which in its upper position engages a gear mounted on the drive shaft and is part of the first speed gear train, and which in its lower position is disengaged from the first speed gear train. There is also provided an operator operable lift mechanism for raising the axially movable gear into engagement with the first speed gear train.

The lift mechanism may, optionally, be left in the up position so that upon successive reversals of drive shaft rotation, the winch successively changes from first speed to second speed and back again. Or, during operation of the winch in its second speed, the lift mechanism can be operated to lower the axially movable gear out of engagement with the first speed gear train, thus upon the next reversal of drive shaft rotation, the winch will operate in its third gear.

Alternatively, the lift mechanism can be operated to lower the axially movable gear to the lower position prior to operation of the winch. This setting will result in the winch being operated in second speed when the drive shaft is rotated in the appropriate direction, and upon reversal of the drive shaft rotation, the winch will operate in third speed. Then upon the next reversal of drive shaft rotation the winch will shift back to second speed.

In a preferred embodiment, the drive shaft's first speed gear is provided with a shoulder located at the bottom of the forwardly facing gear tooths so as to retain the axially-movable gear in its upper position during operation of the winch in its first speed. This retaining shoulder will allow the lift mechanism to be lowered while the axially-movable gear is retained in the upper position, so that the winch being operated in first speed will automatically switch to second speed and third speed upon two successive reversals of drive shaft rotation. This results because upon the first reversal of drive shaft rotation, the axially-movable gear drops to its lower position out of engagement with the first speed gear train. With this preferred embodiment it is possible to lift the traveler gear to its upper position, for engagement with the first speed gear train, where it is retained in the upper position by the shoulder, and then lowering the lift mechanism prior to initiating operation of the winch. Then the winch will provide truly automatic shifting from first speed to second speed to third speed upon two successive reversals of drive shaft rotation. Alternatively, the lift mechanism can be left in its upper position during operation of the winch in both first and second speeds, thus providing only first and second speeds. The benefit of the lift mechanism of this invention is that it allows the operator who has left the lift mechanism in the upper position to decide at any time prior to or during operation of first or second speeds whether third speed is wanted after second speed operation merely by lowering the lift mechanism.

Further, the winch can be shifted directly from first speed to third speed by operating the lift mechanism to place the traveler gear on the shoulder of the first speed gear and then lowering the lift mechanism. Then operating the winch in first speed, stopping drive shaft rotation and allowing the traveler gear to drop down and out of first gear train engagement, and then resuming the same drive shaft rotation which places the winch in third speed.

Accordingly, the winch of this invention can, at the discretion of the operator, be operated between any two of three speeds (i.e., 1-2, 2-3, or 1-3), or be set for automatic shifting from first to second to third speed.

BRIEF DESCRIPTION OF THE DRAWINGS

A preferred embodiment of the invention is illustrated in the accompanying drawings wherein:

FIG. 5 is a partial side view of the winch in FIG. 2 taken along the line V—V in FIG. 3 showing the relationship between the gears on the drive shaft and the traveler gear in the lower position;

FIG. 6 is a partial side view taken along the line VI—VI in FIG. 4 of the lift mechanism positioning the traveler gear in the lower position shown in FIG. 5;

FIG. 7 is a partial side view taken along the line VII—VII of FIG. 3 showing the relationship between the traveler gear in the lower position and the output gear shaft;

FIG. 8 a partial side view of the winch in FIG. 2 showing the relationship between the drive shaft gears and the traveler in the upper position;

FIG. 9 is a partial side view of the lift mechanism positioning the traveler gear in the upper position shown in FIG. 8;

FIG. 10 is a partial side view showing the relationship between the traveler gear in the upper position and the output gear shaft;

DETAILED DESCRIPTION OF PREFERRED EMBODIMENT

Figure 1:
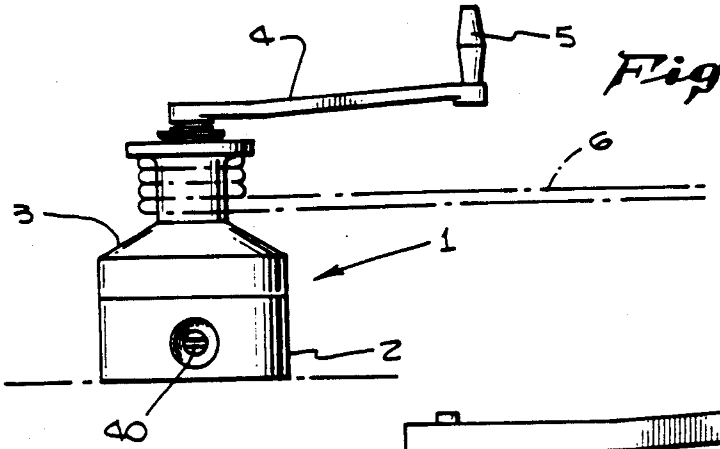
FIG. 1 is a side view of winch.

The winch 1 shown in FIG. 1 is adapted for manual operation; however, the features of this invention are equally adaptable for motor-driven operation. The winch 1 comprises a base 2 and drum 3 which is rotatably supported on the base 2. Also shown is a crank 4 and a crank handle 5. The winch is provided with a receiving socket at its top to receive the end of the crank for locking rotatable connection. A line 6 is being pulled-in as shown in phantom.

Figure 2:
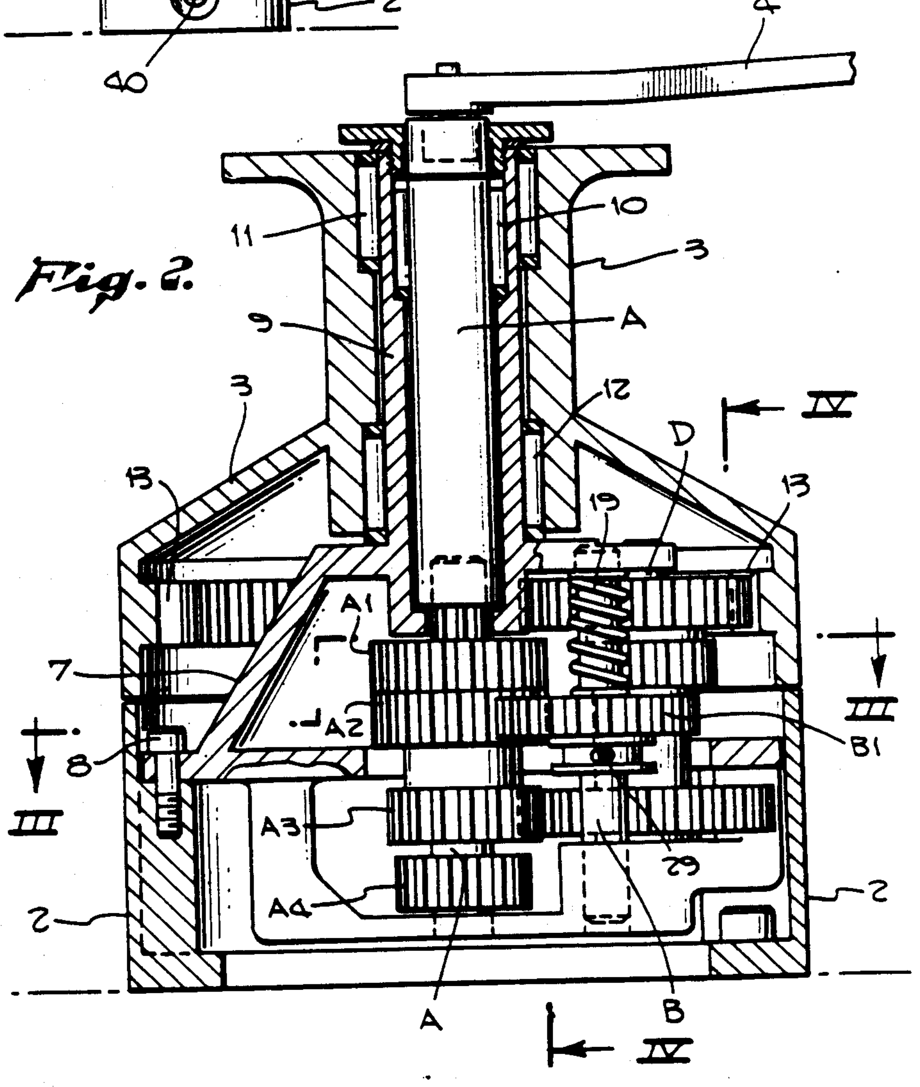
FIG. 2 is the winch of FIG. 1 with the housing removed to reveal the internal gear trains.
Figure 3:
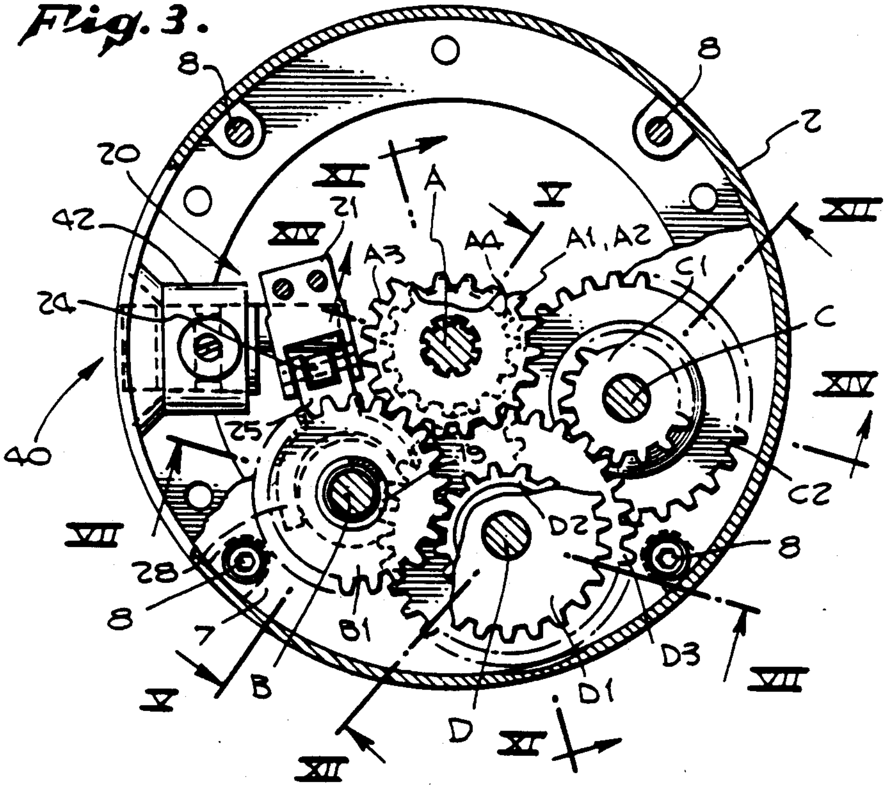
FIG. 3 is a top view of the winch of FIG. 2 taken along the line III—III.
Figure 4:
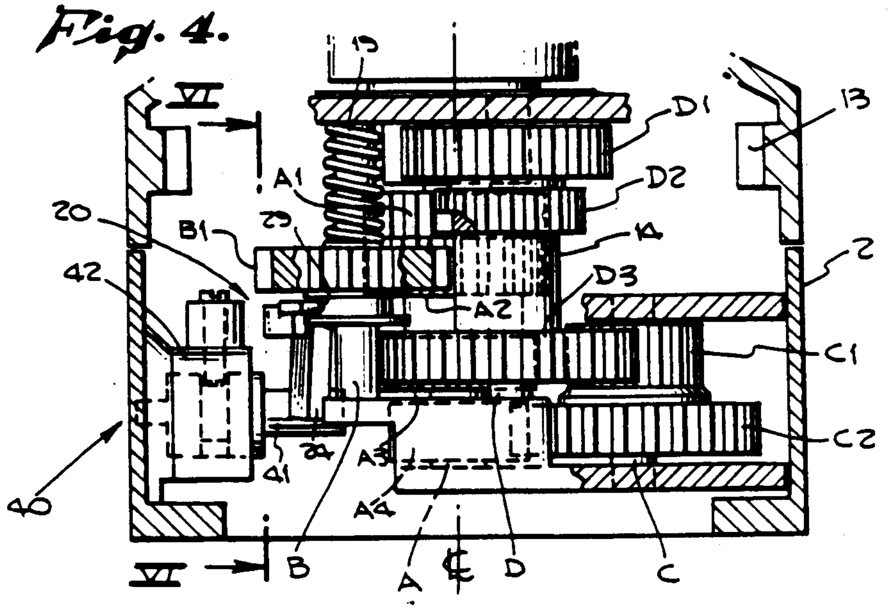
FIG. 4 is a side view of the winch in FIG. 2 taken along the line IV—IV.
Figure 11:
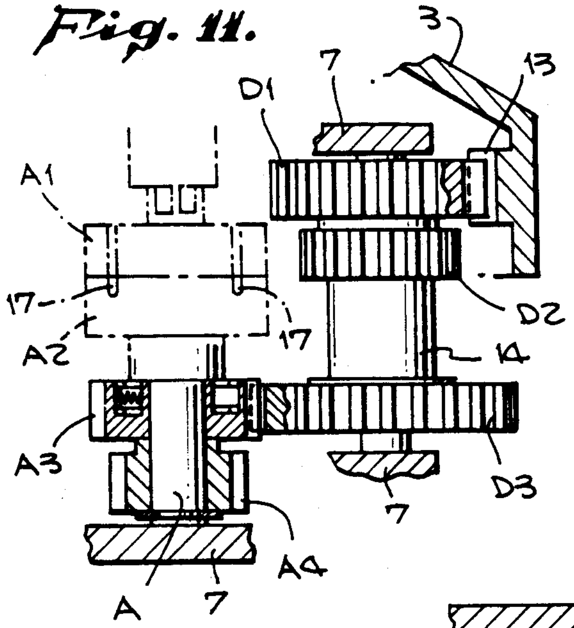
FIG. 11 is a partial side view taken along the line XI—XI of FIG. 3 showing the relationship between the drive shaft and the output gear shaft.

Turning now to FIG. 2, there is shown the base 2, the drum 3, and the internal gear housing 7. The internal gear housing 7 seats within the base 2 and is secured to the base with bolts 8. The gear housing 7 terminates at its upper end in a drive shaft sleeve 9 for housing the centrally located drive shaft A. Roller bearings 10 are positioned between the drive shaft A and the drive shaft sleeve 9. Roller bearings 11 and 12 are positioned between the rotating drum 3 and the drive shaft sleeve 9.

The gear housing 7 supports four shafts, the drive shaft A, the traveler gear shaft B, the reduction gear shaft C, and the output shaft D. The drive shaft A carries gears A1, A2, A3, and A4, numbering from top to bottom. The traveler gear shaft B carries a traveler gear B1 which is axially movable between a lower and an upper position. The reduction gear shaft C carries two gears, Cl and C2, numbered from top to bottom. Finally, the output gear shaft D carries three gears, D1, D2, and D3 from top to bottom, with D1 being the output drive gear which meshes with the drum's internal ring gear 13.

The winch 1 shown in the drawings utilizes the preferred embodiment of the gear box having three speeds or gear trains. The first and third speeds are respectively determined by the position of the traveler gear B1. First speed is achieved when gear B1 is in the up position as shown in FIG. 8 and meshes with gear A1 and gear D2.

The gears on each shaft are connected to their respective shafts as follows. Gears A1 and A2 are unidirectional gears, meaning that in the preferred embodiment they will rotate directly with the shaft when the shaft is rotated in the clockwise direction. In other words the shaft, when rotating clockwise transfers its rotational power to gears A1 and A2. However, by means of a ratchet and pawl mechanism or other unidirectional mechanism, known to the art, when the shaft A rotates counterclockwise, it does not transfer power to the gears A1 and A2. Gear A3 is unidirectional and only turns with the drive shaft A when the drive shaft rotates in a counterclockwise direction. When the shaft A rotates in a clockwise direction, gear A3 is free to rotate subject to whatever power input it receives from another gear. Gear A4 on drive shaft A is fixed to the shaft and rotates directly with the shaft in either direction.

Turning now to traveler gear shaft B and gear B1, this gear rotates freely about shaft B and only rotates subject to the power input it receives from other gears.

Reduction gear shaft C carries two gears, C1 and C2. Gear C1 is free to rotate in either direction around the shaft subject to the input of other gears. Gear C2 is unidirectional and will be driven by gear C1 when C1 rotates counterclockwise, and is free from C1 when gear C1 rotates clockwise. In that event, gear C2 is driven by other gears. Gear C2 will drive gear C1, when it rotates counterclockwise.

The output gear shaft D carries three gears, D1, D2 and D3. The gear D1 is the output drive gear and it meshes with the internal ring gear 13 integrally affixed to the inside rim of the drum 3. It is understood that although a winch is utilized in the preferred embodiment of this invention, the gear box of this invention could be utilized to drive a variety of outputs. The gear D1 is freely rotatable about the output gear shaft D; however due to the design and relationships of all the shafts, gears, and gear trains, the output gear D1 always rotates in the same direction regardless of which direction the drive shaft A is rotated, which is clockwise in the preferred embodiment described herein. The clockwise rotation of the output gear D1 will accordingly cause the drum to rotate in a clockwise direction. It will be apparent to those skilled in the art that in many situations it could be desirable to have the drum rotate in a counterclockwise direction, and the winch of this invention can be simply and easily modified using the same parts to accomplish this result, such as by merely reversing the orientation of the unidirectional mechanisms.

Gear D2 is integral with output drive gear D1 and has a sleeve 14 which extends down and around the output gear shaft D and provides the internal shaft collar 15 for gear D3. The gear D3 is mounted on the shaft D through a unidirectional pawl and ratchet mechanism 16 shown in FIG. 7. The function of gear D3 and its pawl and ratchet mechanism 16 is to transfer power from gear D3 to the output drive gear D1 when the gear D3 is driven in a clockwise direction. When the gear D3 is driven counterclockwise relative to its internal shaft collar 15, the gear rides over the pawls and is disengaged from gears D2 and D1. Also when gear D2 is driven, the internal shaft collar 15 rotates at a speed faster than gear D3 thus effectively overriding the gear D3.

FIGS. 5–10 illustrate the operation of the traveler gear lift mechanism 20. In FIG. 6, it is shown that the lift mechanism 20 is fixedly attached to the gear housing 7 via a stationary arm 21. At the distal end of the stationary arm 21, a cam-operated lever 22 is pivotally supported at 23. The lever 22 comprises a cam follower 24 and a lift arm 25. The cam follower 24 and the lift arm 25 are independently pivoted at 23. The cam follower 24 is provided with a perpendicular extension 26 in which is mounted an adjustment screw 27 whose terminal end abuts the bottom of lift arm 25 in order to define the angular relationship between the cam follower 24 and the lift arm 25. The adjustment screw 27 provides continuous adjustment for the lift arm 25. The lift arm 25 comprises a semi-circular stirrup member 28 with internally extending pins 29. The pins 29 are retainingly received in the circular channel 31 of collar 30 which is integral with traveler gear B1. In other embodiments, the collar could be separate from the gear B1.

The purpose and benefit of having cam follower 24 and lift arm 25 independently pivoted at 23 is that when collar 30 is integrally attached to the traveler gear B1, it allows the lift mechanism 20 to be moved to its lower position and to leave the traveler gear B1 in its upper position, as described hereinafter. In the alternative, if it were desired to have cam follower 24 and lift arm 25 fixed to one another at a fixed angle, then it would be preferable to separate the collar 30 from the gear B1 so that they are separately movable on the shaft B.

The traveler gear lift mechanism 22 includes a controller mechanism which allows the winch operator to position the traveler gear B1 in either the up or down position. The controller mechanism includes a rotatable cylindrical knob 40 which extends externally from the base 2 and is adapted to be manually rotated in any direction. A cam 41 is integrally affixed to the distal end of the knob 40. The knob 40 is housed in a cylindrical knob housing 42. Manual rotation of the knob 40 moves the cam 41 which in turn moves the cam follower 24. In one cam position the traveler gear B1 is in the up position as seen in FIGS. 8, 9, and 10, and in an other position, the traveler gear B1 is in the lower position as seen in FIGS. 5, 6, and 7.

Also seen in FIGS. 5–10 is a spring 17 which is positioned around shaft B above gear B1 between the housing 7 and the gear B1. This spring 17 serves to bias the gear B1 downwardly. The use of such a biasing means eliminates the need to rely on gravity to move gear B1 down, and thus permits the winch to operate in any orientation.

Although the embodiment of the lift mechanism 20 shown in the drawing is the preferred embodiment, it will be recognized by those skilled in the art that other embodiments of a gear lift mechanism are possible and included in the term lift mechanism.

OPERATION OF WINCH

Now will follow a description of how the winch can be operated in three speeds, as well as in any combination of two speeds.

The winch is operated in the first speed by moving the traveler gear B1 to the upper position, and then rotating the drive shaft A in the clockwise direction. As discussed above, in the arrangement of this embodiment, the drum 3 will rotate at a fast speed in the clockwise direction.. This fast rotational speed provides the smallest mechanical advantage and is useful when the line load is small and it is desirable to pull in the line as quickly as possible.

The first speed is obtained through the following gear train. The drive shaft A rotates clockwise which through the unidirectional mechanism in gear A1 drives gear A1 clockwise. Gear A1 drives gear B1 in a counterclockwise direction. Gear B1 drives gear D2 in a clockwise direction. Since gear D2 and D1 are integral, gear D1 will also rotate in a clockwise direction. Gear D1 is the output drive gear and it will drive the drum, through the ring gear 13, in a clockwise direction at the fastest speed.

The second speed is activated by reversing the direction of rotation of the drive shaft. Because gears A1 and A2 are unidirectional, they will no longer drive gear B1. However, gear A3, a unidirectional gear, is driven in a counterclockwise direction and will in turn drive unidirectional gear D3 in a clockwise direction. Gear D3 will drive output gear D1 in a clockwise direction which drives the drum in a clockwise direction. The second speed is a medium speed which provides a greater mechanical advantage than the first speed, and accordingly a slower drum rotation speed for a given drive shaft rotation speed.

If the traveler gear is held in its upper position in engagement with the first speed gear train, a second reversal of the drive shaft to a clockwise rotation will return the winch to the first speed. This arrangement will allow the winch to operate between first and second speed only upon successive reversals of drive shaft rotation. However, if during the operation of the winch in second speed, it is desired to switch to third speed, the traveler gear lift mechanism is operated to lower the traveler gear B1 to its lower position. This disengages the gear B1 from the first speed gear train (i.e., B1 from D2). Then upon the second reversal of rotation of the drive shaft back to a clockwise rotation, the third speed is engaged.

The third speed is obtained as follows. Shaft A rotates in a clockwise direction which drives gear A4 in a clockwise direction. Gear A4 drives unidirectional gear C2 in a counterclockwise direction. Gear C2, through shaft C, drives gear C1 in a counterclockwise direction. Gear C1, in turn, drives gear D3 in a clockwise direction which through shaft D drives output drive gear D1 clockwise which causes the drum 3 to rotate clockwise.

If desired, the winch can be operated between second and third speeds only by leaving the traveler gear B1 in its lower position, and by first rotating the drive shaft counterclockwise for second speed operation and then reversing the drive shaft rotation to clockwise rotation for third speed operation. Successive reversals of the drive shaft rotation will shift the winch speed back and forth from second to third.

Figure 15:
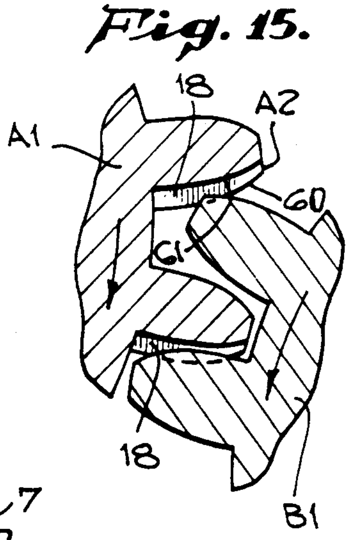
FIG. 15 is a partial top view of FIG. 8 of the top drive shaft gears and the traveler gear, revealing the retaining shoulder.
Figure 12:
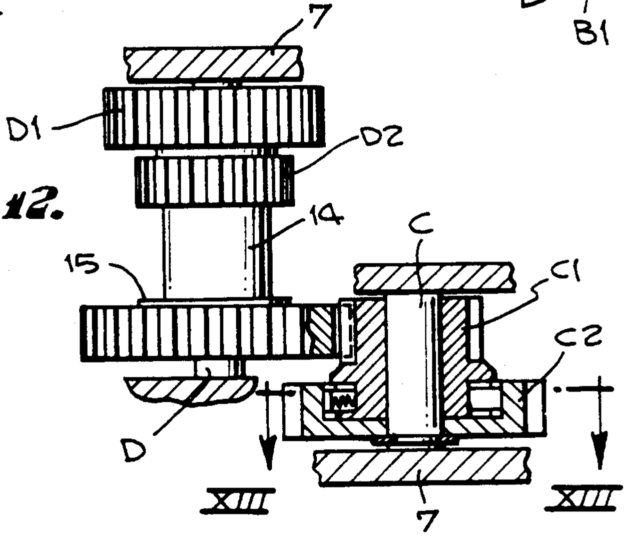
FIG. 12 is a partial side view taken along the line XII—XII of FIG. 3 showing the relationship between the drive shaft a the reduction gear.
Figure 14:
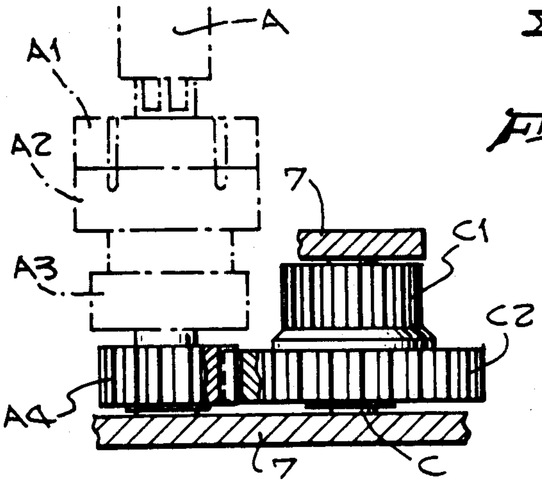
FIG. 14 is a partial side view taken along the line XIV—XIV of FIG. 3 of the drive shaft and the reduction gear shaft.
Figure 13:
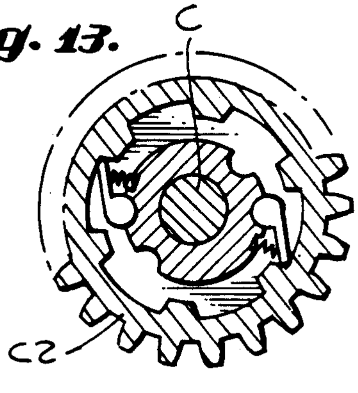
FIG. 13 a top view of the gear in FIG. 12 taken along the line XIII—XIII.

An additional feature of the preferred winch is provided by the construction and design of gears A1 and A2. As shown in FIG. 15, gears A1 and A2 have the same pitch (i.e., same number of teeth); however, the gear teeth on gear A2 are thicker. The respective teeth on gears A1 and A2 are arranged such that in the preferred embodiment, the counterclockwise-facing sides of the teeth on gears A1 and A2 are flush, whereas the clockwise-facing surfaces of the gear teeth are not flush, the thicker teeth of gear A2 provide a small leading shoulder 18. Because of this structure, the clockwise-facing surface 60 or gear A2 can be called the leading face, and the clockwise facing surface of A1 can be called the trailing face. In operation, when the traveler gear B1 is in its upper position and the drive shaft is being rotated in a clockwise direction, the shoulder 18 provided by the thicker teeth on gear A2 will retain the traveler gear B1 in its upper position and prevent it from moving down to the lower position while the gears are being rotated. It will be appreciated that the width of the shoulder 18 is made sufficient to avoid accidental displacement of the traveler gear B1, and a shoulder width of about 1–2 millimeters will prevent most accidental displacements. See FIG. 15. It can be seen that if it is desired to have the traveler gear B1 move down to its lower position out of engagement with the first speed gear train, the traveler gear lift mechanism is raised to lift the traveler gear B1 to its upper position. There, a slight rotation of the drive shaft in the clockwise direction will position the shoulder 18 beneath the traveler gear B1 so as to retain the gear B1 in the upper position. The lift mechanism can then be lowered without traveler gear B1 being lowered, and the traveler gear B1 is now set for automatic shifting to its lower position by any counterclockwise rotation of the drive shaft such that the shoulder 18 is remoVed from underneath the gear B1.

It is preferable, to form gears A1 and A2 separately, and to provide guide pin holes through both gears A1 and A2 to receive guide pins 17 which will properly align the gear teeth so that the shoulder is properly positioned for clockwise first speed rotation. If it is desirable to have the drum rotate counterclockwise or to provide counterclockwise first speed rotation, a second set of guide pin holes can be provided in the gears A1 and A2 to position the retaining shoulder on the other side of the gear tooth space.

In essence the gear A2 can be replaced by a lip extension at the same location at the bottom of the gear A1 tooth space, in view of the fact that gear A2 serves no driving function. However, it is preferred to provide gear A2 with or without the retaining shoulder or lip because although it may be a "dummy gear", it serves a guiding function. It serves a guiding function in that the gear A2 meshes with the teeth in gear B1 and thus times the gear B1 to synchronize the smooth upward movement back into engagement with gears A1 and D2. In other words, if it were desired not to provide the shoulder 18 or lip to retain the traveler gear B1 in its upper position without the aid of the lift mechanism 20, it would still be desireable to provide gear A2 having teeth which were completely flush with the teeth of gear A1 to provide the timing and synchronization function. In such a case the gear A1 and gear A2 would in reality be one axially long gear whereby when traveler gear B1 is in its upper position meshing with the top portion of the gear A1, the first speed gear train would be engaged, and when traveler gear B1 is in its lower position meshing with the lower portion of gear A1, gear B1 would be out of engagement with the first speed gear train.

It will be appreciated from the above that this winch will operate at three speeds upon two reversals of the drive shaft rotation. If desired, the winch can be operated as a two speed winch, alternating between the first and second speeds, the first and third speeds, or the second and third speeds.

To operate the winch between only the first and second speeds, one merely has to leave the traveler gear lift mechanism in the upper position so that upon a second reversal of drive shaft rotation, the winch returns to first speed operation.

To operate the winch between only second and third speeds, the traveler gear mechanism is placed in the lower position so that the traveler gear B1 never is placed in the upper first speed position in engagement with the first speed gear train. Then, the drive shaft is first rotated counterclockwise to operate the winch in second speed and upon a first reversal of the drive shaft, the winch will be in third speed; and then upon a second reversal, the winch will return to its second speed.

In order to operate the winch in first and third speeds only, the winch is operated as if for normal first, second, and third speed operation; however, upon completion of first speed operation, the winch is placed in third speed without reversal of the rotation of the drive shaft and passing through second gear by stopping the rotation of the center drive shaft and allowing the traveler gear B1 to drop into its lower position. Depending on the design of the gears, and the width of the shoulder, it may require a small amount of back and forth movement to facilitate the dropping of the traveler gear B1.

It should be understood that although a preferred embodiment has been disclosed other embodiments obvious to those skilled in the art could be designed.

I claim:

1. A gear for use in a gear box wherein a driving face of each tooth includes a shoulder located intermediate the top and bottom of the gear which divides the face into a leading face and a trailing face relative to the driving direction of rotation, both the leading face and the trailing face being adapted to drive an adjacent gear, so that said adjacent gear, which is mounted to be axially movable is, when in driving engagement with the trailing face, prevented by the shoulder from moving axially to engage the leading face until the adjacent gear clears the shoulder.

2. The gear defined in claim 1 wherein the gear is comprised of two conventional gears having the same number of teeth and positioned one on top of the other, the teeth of one gear are thicker than the teeth of the other, and means for aligning the two gears so that the thicker teeth of the one gear forms the shoulder of the leading face.

3. The gear defined in claim 1 further including a second gear which is in driving engagement with the first gear and is mounted to be axially movable relative to the first gear so that it can be alternately driven by the leading face or the trailing face of the first gear.

4. The gear defined in claim 1 wherein the gear is made entirely of the same material.

* * * * *